United States Patent
Grimaud

(10) Patent No.: US 10,250,136 B2
(45) Date of Patent: Apr. 2, 2019

(54) METHOD FOR CONTROLLING A DC-DC CONVERTER AND A DC-DC CONVERTER FOR IMPLEMENTING SUCH A CONTROL METHOD

(71) Applicant: SAFRAN ELECTRONICS & DEFENSE, Boulogne Billancourt (FR)

(72) Inventor: Louis Grimaud, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 15/780,356

(22) PCT Filed: Dec. 2, 2016

(86) PCT No.: PCT/EP2016/079641
§ 371 (c)(1),
(2) Date: May 31, 2018

(87) PCT Pub. No.: WO2017/093515
PCT Pub. Date: Jun. 8, 2017

(65) Prior Publication Data
US 2019/0006943 A1 Jan. 3, 2019

(30) Foreign Application Priority Data

Dec. 4, 2015 (FR) ..................... 15 61867

(51) Int. Cl.
*H02M 3/156* (2006.01)
*H02M 1/08* (2006.01)
*H02M 1/00* (2006.01)

(52) U.S. Cl.
CPC ............. *H02M 3/156* (2013.01); *H02M 1/08* (2013.01); *H02M 2001/0032* (2013.01); *H02M 2003/1566* (2013.01)

(58) Field of Classification Search
CPC ................. H02M 3/156; H02M 1/08
See application file for complete search history.

(56) References Cited

U.S. PATENT DOCUMENTS 5,170,333 A 12/1992 Niwayama
6,366,070 B1 4/2002 Cooke et al.
(Continued)

FOREIGN PATENT DOCUMENTS

DE 41 36 809 A1 5/1992
DE 10 2015 102417 A1 8/2015

OTHER PUBLICATIONS

Feb. 7, 2017 Search Report issued in International Patent Application No. PCT/EP2016/079641.
(Continued)

*Primary Examiner* — Jue Zhang
*Assistant Examiner* — Kevin H Sprenger
(74) *Attorney, Agent, or Firm* — Oliff PLC; R. Brian Drozd

(57) ABSTRACT

A method for controlling a DC-DC converter including an energy accumulation element, an energy storage element and a switching element, said control method including the following steps implemented by a control unit: a step of generating a control signal for the switching element with a duty cycle α that is a function of information relating to the output electrical conditions of said converter; a step of controlling said switching element by means of said control signal; a step of compensating said control signal for a continuous conduction mode; a step of compensating said control signal for a discontinuous conduction mode; and a step of estimating the current operating mode of said converter in order to control the implementation either of the compensation step or of the compensation step as a function of the estimated current operating mode. The invention (Continued)

further relates to a DC-DC converter for implementing said control method.

11 Claims, 5 Drawing Sheets

(56) References Cited

U.S. PATENT DOCUMENTS

| | | | | |
|---|---|---|---|---|
| 2006/0097711 | A1* | 5/2006 | Brandt | H01F 30/10 323/282 |
| 2007/0063682 | A1 | 3/2007 | Dagher | |
| 2010/0039836 | A1* | 2/2010 | Gong | H02M 3/156 363/21.13 |
| 2013/0027996 | A1* | 1/2013 | Baurle | H02M 3/156 363/78 |
| 2013/0135775 | A1* | 5/2013 | Yao | H02H 9/025 361/18 |
| 2015/0244261 | A1 | 8/2015 | Toshiyuki | |
| 2015/0349630 | A1 | 12/2015 | Peng et al. | |
| 2016/0233766 | A1* | 8/2016 | Todorov | H02M 3/1584 |
| 2017/0179833 | A1* | 6/2017 | Adragna | H02M 3/335 |
| 2017/0373585 | A1* | 12/2017 | Anwar | H02M 1/08 |

OTHER PUBLICATIONS

Morroni et al; "Robust Adaptive Tuning of Digitally Controlled Switched-Mode Power Supplies;" Applied Power Electronics Conference and Exposition; Feb. 15, 2009; XP031442683; pp. 240-246.
Jing et al; "A Fast Fixed-Frequency Adaptive-On-Time Boost Converter With Light Load Efficiency Enhancement and Predictable Noise Spectrum;" IEEE Journal of Solid-State Circuits; vol. 48; No. 10; Oct. 1, 2013; XP011527454; pp. 2442-2456.

* cited by examiner

METHOD FOR CONTROLLING A DC-DC CONVERTER AND A DC-DC CONVERTER FOR IMPLEMENTING SUCH A CONTROL METHOD

The present invention relates to a method for controlling a DC-DC converter, also called switch-mode power supply, and to such a DC-DC converter.

The general principle of a DC-DC converter is shown in FIG. 1. An input voltage Ve is periodically interrupted by means of a switching element 10 such that, in a first part of each period, electrical energy is accumulated in an accumulation element 20 then, in a second part of this period, the accumulated energy is transferred to a storage element 30. In the first part of the following period, while the stored energy is again accumulated in the accumulation element 20, the energy stored during the preceding period is used to supply a load Z. The output voltage of the load Z at the terminals is controlled by a control unit 40, which receives, on the one hand, information relating to the output electrical conditions (for example, the output voltage) and, on the other hand, a setpoint, in the form of a setpoint voltage V, for example. This control unit 40 controls the switching element 10 so that the setpoint is respected.

Various configurations of DC-DC converters are known. Assemblies called Buck, Boost, Buck-Boost, Flyback, etc. can be cited.

FIG. 2 shows, by way of an example, an assembly called Flyback assembly, in which the accumulation element 20 is a transformer, the storage element 30 is a capacitor, which is isolated from the secondary winding of the converter 20, during the first part of each period, by a diode 31.

It is known that such DC-DC converters can operate in at least two distinct modes: one is called Continuous Conduction Mode (CCM), the other is called Discontinuous Conduction Mode (DCM). In the CCM mode, the second part of a period is rather short so that the energy accumulated in the accumulation element 20 is not cancelled out at the end of this part of the period. In contrast, in the DCM mode, the energy accumulated in the accumulation element 20 is cancelled out.

It can be seen that, in the CCM mode, the voltage conversion ratio is only a function of the duty cycle of the switching period of the switching element 10, i.e. the ratio of the first part of the period over the period, generally denoted $\alpha$. Thus, for example, with respect to the Flyback assembly of FIG. 2, it can be seen that, in the CCM mode, the ratio of the output voltage Vs to the input voltage Ve is expressed as follows:

$$Vs/Ve = \alpha/N(1-\alpha),$$

where $\alpha$ is the duty cycle of the switching and N is the ns/np ratio of the number ns of turns of the secondary winding to the number np of turns of the primary winding of the transformer 20. In particular, it is to be noted that this conversion ratio is independent of the value of the load Z and thus of the output current drain.

In contrast, in the DCM mode, this Vs/Ve conversion ratio is a function of the value of the load Z and thus, to a certain extent, of the current drain. For example, in the case of a Flyback assembly, this conversion ratio is expressed as follows:

$$Vs/Ve = \alpha \sqrt{\frac{Z}{2 \cdot Lp \cdot fd}},$$

where Z is the value of the load Z, Lp is the inductance of the transformer 20 with respect to its primary winding and fd is the switching frequency of the switching element 10.

In the same way, the following can be written for any type of switch-mode power supply:

$Vs/Ve = c(\alpha)$ for the CCM mode and $Vs/Ve = d(Z, Lp, fd, \alpha, \text{etc.})$.

In general, and further to the foregoing, the static and dynamic features of these two operating modes are different such that in general, in order to provide good regulation stability and to maintain good performance levels, particularly dynamic performance levels, the control unit 40 exclusively regulates either on the basis of the output voltage or on the basis of the output current, depending on the selected operating mode.

However, following variations of the load that often are not actually controlled a transition from one operating mode to another is particularly possible. In this case, the performance levels of the regulation carried out by the control unit 40 are degraded.

A first solution to this problem of degradation of the regulation performance levels when changing from one operating mode to another involves the control unit 40 regulating both on the basis of the output voltage and on that of the output current, as well as analogical management of the mode changeover. However, this dual voltage/current regulation generally requires additional components, such as a current transformer, a current controller, a compensator, etc., which adds to the cost of such a solution.

A second solution involves the control unit 40 providing voltage regulation exclusively and being equipped with a compensator specially synthesized to provide the stability for the continuous conduction mode (which is the most difficult to correct from a dynamic perspective). However, in general, exclusively voltage (as well as exclusively current) regulation significantly degrades the performance levels in discontinuous conduction mode, particularly with respect to the response time, which is very low, which introduces harmonic distortions and losses.

Therefore, the aim of the present invention is to propose a DC-DC converter, the control unit of which provides regulation and stability with optimal performance levels, both in continuous conduction mode and in discontinuous conduction mode.

The present invention further relates to a method for controlling such a converter, particularly implemented by a control unit. Such a method for controlling a DC-DC converter of the type comprising an energy accumulation element, an energy storage element and a switching element, conventionally comprises the following steps implemented by a control unit:

a step of generating a control signal for the switching element with a duty cycle $\alpha$ that is a function of information relating to the output electrical conditions of said converter; and a step of controlling said switching element by means of said control signal. According to the present invention, this control method is characterized in that it further comprises:

a step of compensating said control signal for a continuous conduction mode;

a step of compensating said control signal for a discontinuous conduction mode;

a step of estimating the current operating mode of said converter in order to control the implementation of either compensation step as a function of the estimated current operating mode.

Still according to the present invention, said estimation step comprises the following steps:
a step of computing the theoretical duty cycle in continuous conduction mode;
a step of computing the theoretical value of the limit duty cycle between the two CCM and DCM operating modes;
a step of comparing the value of the theoretical duty cycle in continuous conduction mode, the theoretical value of the limit duty cycle and the value of the current duty cycle; and
a step of determining the continuous conduction mode CCM if the value of the current duty cycle is greater than the value of the theoretical duty cycle in continuous conduction mode;
a step of determining the discontinuous conduction mode DCM if the value of the current duty cycle is less than the theoretical value of the limit duty cycle; and
a step of indetermining the operating mode if the value of the current duty cycle is between the theoretical value of the limit duty cycle and the value of the theoretical duty cycle in continuous conduction mode.

This control method comprises advantageous features that are explained throughout the remainder of the description of particular embodiments.

The present invention further relates to a DC-DC converter for implementing the present control method as previously described.

The aforementioned features of the invention, as well as other features, will become more clearly apparent upon reading the following description of an embodiment, said description being provided with reference to the accompanying drawings, in which.

Figure 1:
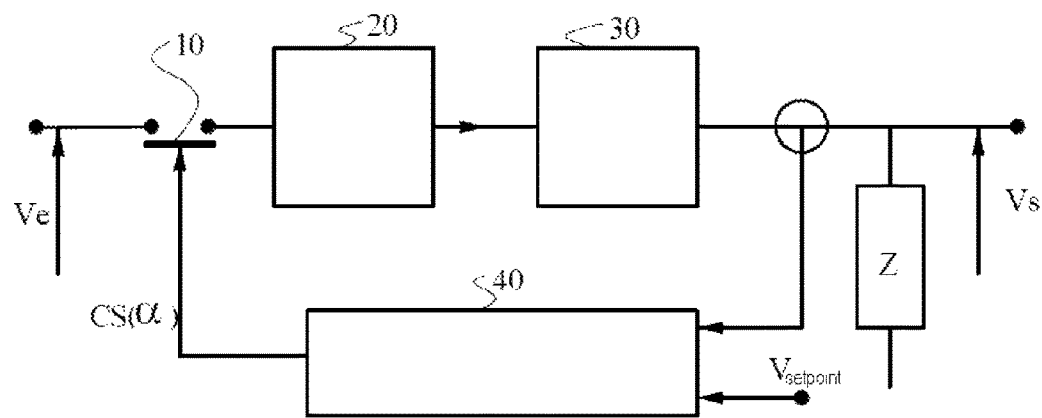
FIG. 1 shows a general block diagram of a DC-DC converter.
Figure 2:
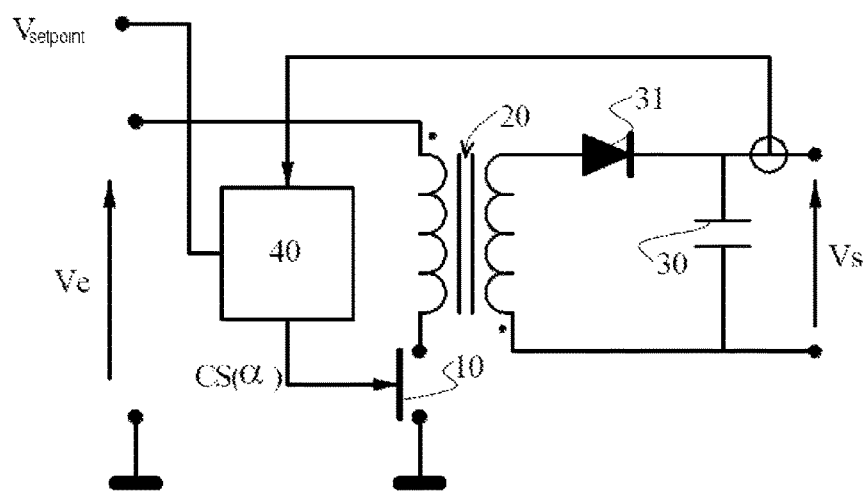
FIG. 2 shows a block diagram of a DC-DC converter of the Flyback type.
Figure 3:
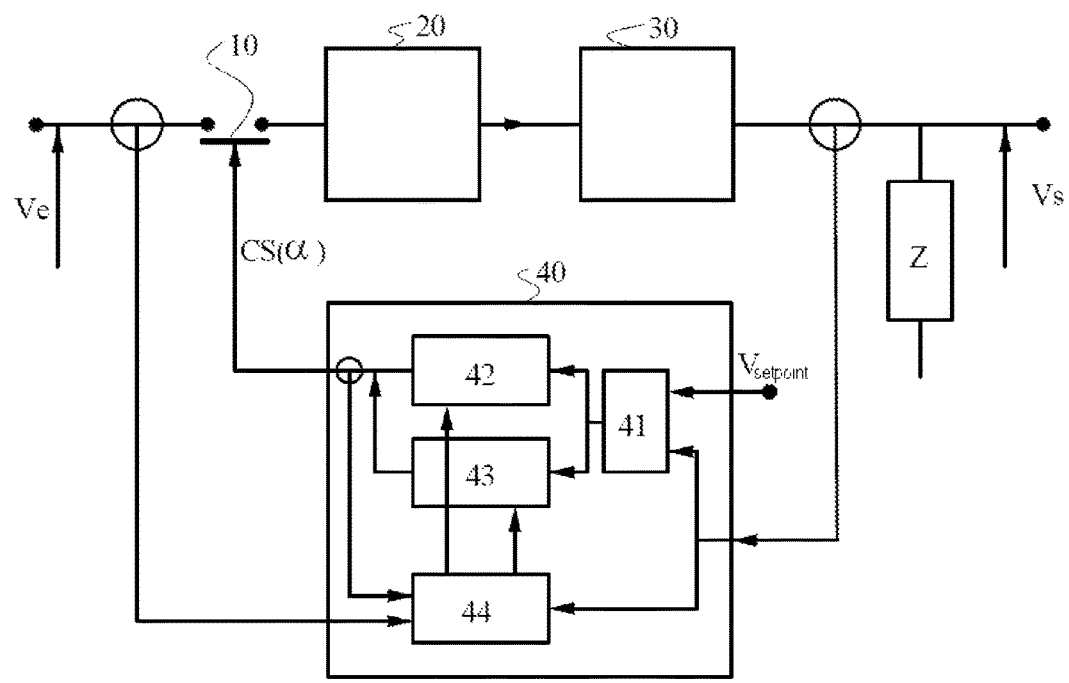
FIG. 3 shows a general block diagram of a DC-DC converter according to the present invention.

FIG. 3 shows a DC-DC converter according to the present invention and reuses the general block diagram of FIG. 1. The same elements as in FIG. 1 have the same reference numerals. According to the invention, the control unit 40 comprises a regulator 41, a compensator 42 for the continuous conduction mode, a compensator 43 for the discontinuous conduction mode and a mode estimator 44.

The regulator 41 has an input for receiving information relating to the output electrical conditions (for example, output voltage) measured at the output of the power supply and an input for the setpoint, for example, in the form of a voltage. It generates a control signal in the form of a periodic signal with a given frequency and a variable duty cycle. Such a regulator 41 is known to a person skilled in the art.

The compensators 42 and 43 are also known to a person skilled in the art. They are respectively conventional compensators for the considered operating mode. They deliver a control signal CS for the switching element 10 in the form of a periodic signal with a given frequency and variable duty cycle α.

The estimator 44 receives, on a first input, information relating to the electrical output conditions, for example, the value of the output voltage Vs, on a second input, information relating to the input electrical conditions, for example, the value of the input voltage Ve and, on a third input, a measurement of the duty cycle of the output control signal of either compensator 42, 43. The estimator 44 estimates the operating mode that is present and controls the activity of the compensator 42 or 43 corresponding to the estimated operating mode.

Figure 4:
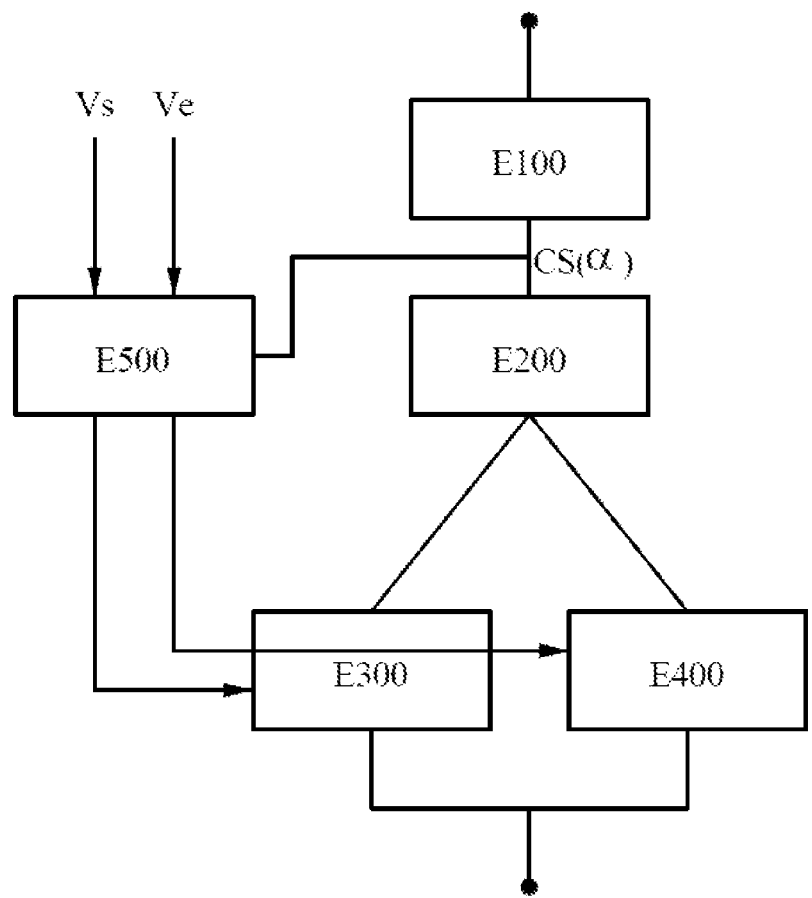
FIG. 4 shows a view illustrating a control method according to the present invention.

The control method that is implemented by the control unit 40 is shown in FIG. 4 and comprises, in a manner per se known, a step E100 of generating a control signal CS(α) for the switching element 10 with a duty cycle α that is a function of information relating to the output electrical conditions of said converter (output voltage or current of the converter) and a step E200 of controlling said switching element 10 by means of said control signal CS(α) generated in step E100.

According to the present invention, this control method comprises a step E300 (which step is implemented by the CCM mode compensator 42) of compensating said control signal for the continuous conduction mode (CCM) of said converter, a step E400 (which step is implemented by the DCM mode compensator 43) of compensating said control signal for the discontinuous conduction mode (DCM) and a step E500 (which step is implemented by the estimator 44 of the converter) of estimating the current operating mode of said converter in order to control the implementation either of step E300 or of step E400 as a function of the estimated current operating mode.

Figure 5:
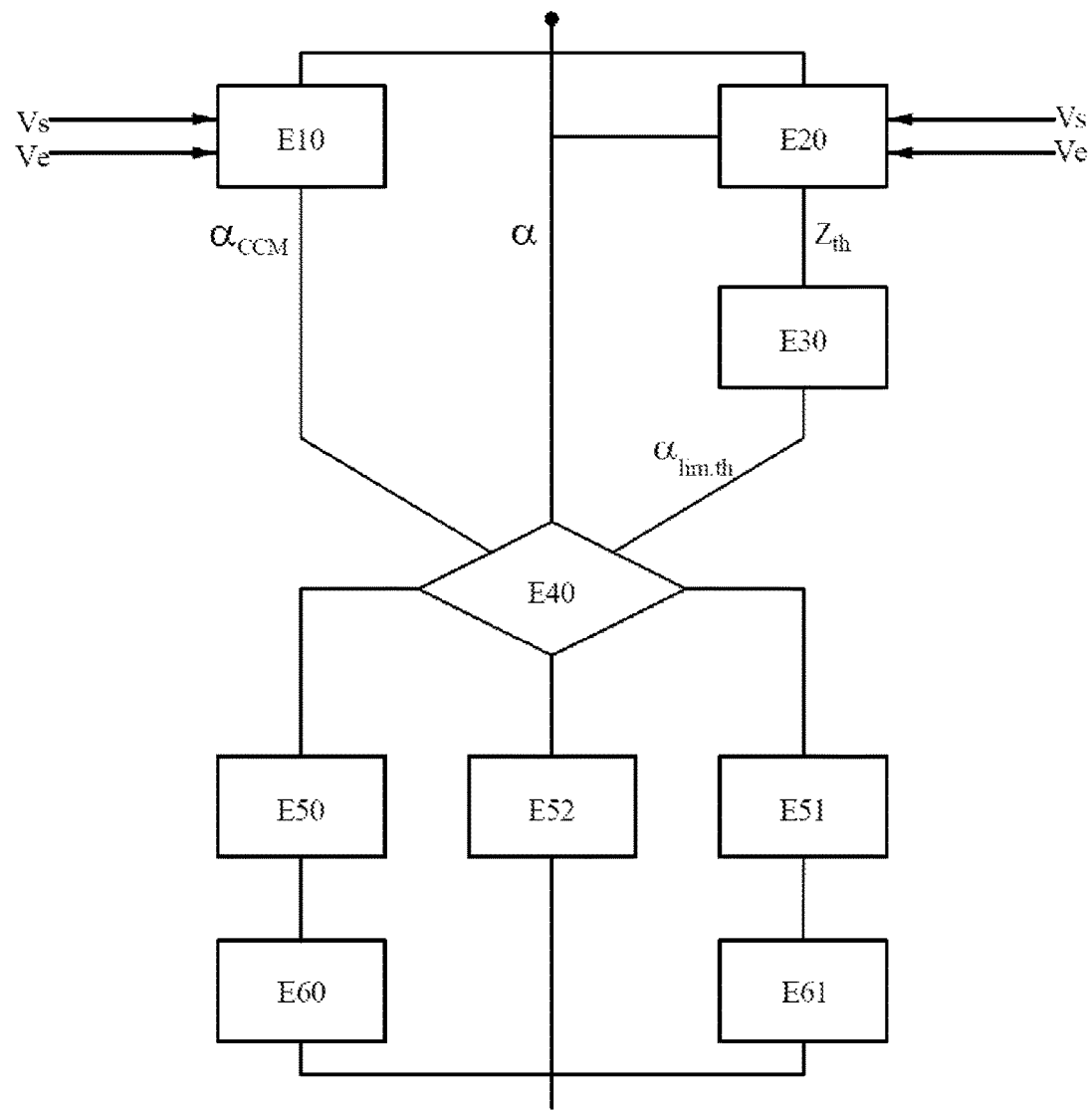
FIG. 5 shows a view illustrating the step of estimating the mode of a control method according to the present invention.

The estimating step E500 will now be described with reference to FIG. 5. It comprises the following steps periodically implemented by the estimator 44:

a step E10 of computing the theoretical duty cycle $\alpha_{CCM}$ in continuous conduction mode, which only depends on input Ve and output Vs voltages, namely:

$$\alpha_{CCM} = f(Vs/Ve);$$

a step E20 of computing the current theoretical value of the load $Z_{th}$ by considering that the converter operates in a stable manner in a discontinuous conduction mode and by considering the value of the duty cycle α of the control signal CS(α) of the switching element 10, the ratio of the output voltage Vs to the input voltage Ve, the no-load values of the components forming the converter and the values of the various operating parameters of the converter, such as the frequency $f_d$ of the control signal CS. For example, in the case of a converter of the Flyback type, the theoretical load $Z_{th}$ can be computed on the basis of the following expression:

$$Z_{th} = \frac{2 L_p f_d}{\left(\frac{Ve}{Vs} \cdot \alpha\right)^2},$$

where $L_p$ is the inductance of the transformer 20 with respect to its primary winding and $f_d$ is the switching frequency of the switching element 10. In general, the theoretical load $Z_{th}$ can be computed on the basis of an expression of the following type:

$Z_{th} = g(\alpha, Vs/Ve, f_d,$ values of components, etc.).

A simulation was used to demonstrate that, due to the fact that the various elements of the power converter dissipate energy, for example, in the form of thermal energy, the theoretical value $Z_{th}$ of the load is necessarily lower than the actual value of the load Z.

a step E30 of computing the theoretical value of the limit duty cycle between the two CCM and DCM operating modes, which value is denoted $\alpha_{lim.th}$, by considering the ratio of the output voltage Vs to the input voltage Ve, the no-load values of the components forming the converter and the values of the various operating parameters of the converter, such as the frequency $f_d$ of the control signal CS. For example, in the case of a converter of the Flyback type, the theoretical value of the limit duty cycle $\alpha_{lim.th}$ can be computed on the basis of the following expression:

$$\alpha_{lim \cdot th} = 1 - \sqrt{\frac{2L_p f_d}{Z_{th} N^2}}.$$

In general, the theoretical value of the limit duty cycle $\alpha_{lim.th}$ can be computed on the basis of an expression of the following type:

$\alpha_{lim.th} = h(Z_{th}, f_d,$ values of components, etc.).

It was also possible to verify that the theoretical value of the limit duty cycle $\alpha_{lim.th}$ is necessarily less than the actual value of the actual limit duty cycle.

a step E40 of comparing the value of the theoretical duty cycle $\alpha_{CCM}$ in continuous conduction mode, the theoretical value of the limit duty cycle $\alpha_{lim.th}$ and the value of the current duty cycle $\alpha$; and, following this comparison;

a step E50 of determining the continuous conduction mode CCM if the value of the current duty cycle $\alpha$ is greater than the value of the theoretical duty cycle $\alpha_{CCM}$ in continuous conduction mode;

a step E51 of determining the discontinuous conduction mode DCM if the value of the current duty cycle $\alpha$ is less than the theoretical value of the limit duty cycle $\alpha_{lim.th}$;

a step E52 of indetermining the operating mode if the value of the current duty cycle $\alpha$ is between the theoretical value of the limit duty cycle $\alpha_{lim.th}$ and the value of the theoretical duty cycle $\alpha_{CCM}$ in continuous conduction mode.

Following the step E50, the control unit 40 implements a step E60 of activating the implementation of the continuous conduction mode compensation step E300 if this step is not already activated and, following the step E51, a step E61 of activating the implementation of the discontinuous conduction mode compensation step E400 if this step is not already activated. Finally, following the step E52, no change is made.

Steps E100, E200, E300, E400 and E500 of the control method according to the present invention are implemented by corresponding means of the control unit 40 (see FIG. 3).

Figure 6:
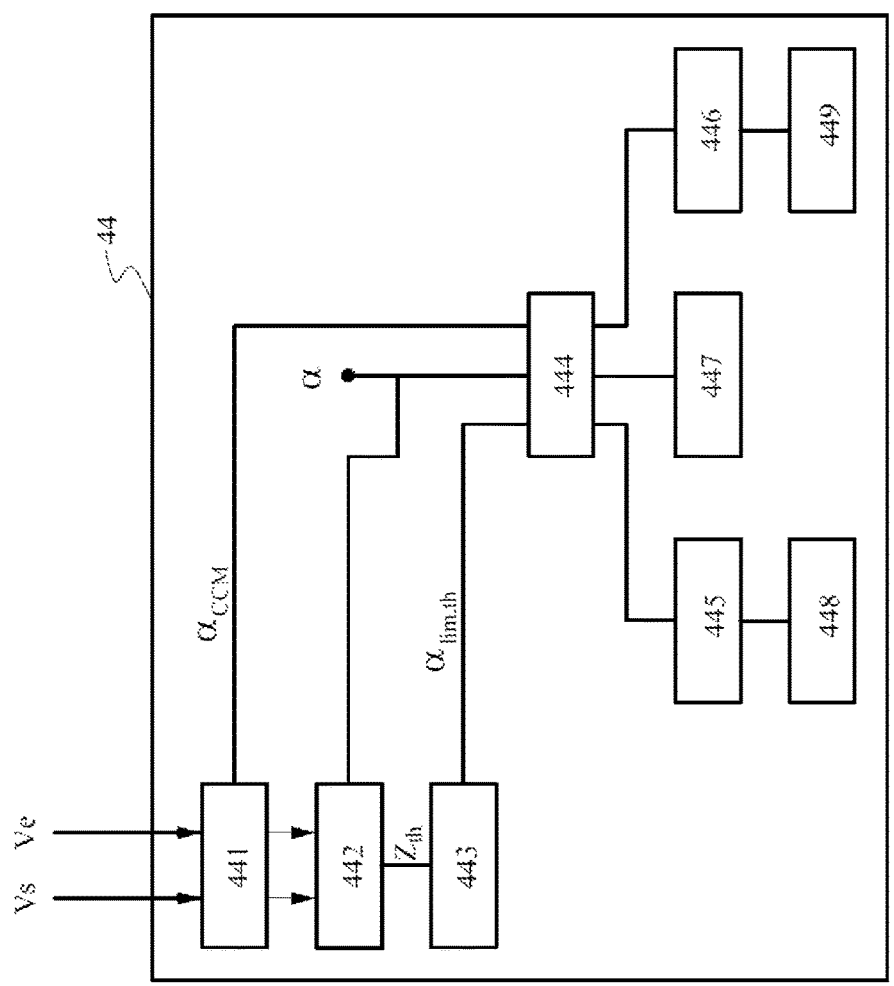
FIG. 6 shows a block diagram showing the estimator means of a control unit for a DC-DC converter according to the present invention.

More specifically (see FIG. 6), the estimating step E500 is implemented to this end by an estimator 44 that comprises the following means:

computation means 441 for implementing the step E10 of computing the theoretical duty cycle $\alpha_{CCM}$ in continuous conduction mode;

computation means 442 for implementing the step E20 of computing the current theoretical value of the load $Z_{th}$;

computation means 443 for implementing the step E30 of computing the theoretical value of the limit duty cycle $\alpha_{lim.th}$ between the two CCM and DCM operating modes;

comparison means 444 for implementing the step E40 of comparing the value of the theoretical duty cycle $\alpha_{CCM}$ in continuous conduction mode, the theoretical value of the limit duty cycle $\alpha_{lim.th}$ and the value of the current duty cycle $\alpha$;

means 445 for implementing the step E50 of determining the continuous conduction mode CCM if the value of the current duty cycle $\alpha$ is greater than the value of the theoretical duty cycle $\alpha_{CCM}$ in continuous conduction mode;

means 446 for implementing the step E51 of determining the discontinuous conduction mode DCM if the value of the current duty cycle $\alpha$ is less than the theoretical value of the limit duty cycle $\alpha_{lim.th}$; and means 447 for implementing the step E52 of indetermining the operating mode if the value of the current duty cycle $\alpha$ is between the theoretical value of the limit duty cycle $\alpha_{lim.th}$ and the value of the theoretical duty cycle $\alpha_{CCM}$ in continuous conduction mode.

These means can be hardware or software. In the case of software, the control unit 40 can be a specialized programmable integrated circuit, of the microcontroller type. The means 41, 42 and 43, as well as the means 441 to 447 are then parts of a program or sub-programs that comprise instructions or parts of code for implementing corresponding steps of the control method according to the invention, when said program is executed by the control unit 40. For example, these parts of a program or sub-programs are stored in a read only memory (not shown) of the control unit 40.

The invention claimed is:

1. A method for controlling a DC-DC converter comprising an energy accumulation element, an energy storage element and a switching element, said control causing the control unit to perform:

generating a control signal for the switching element with a duty cycle $\alpha$ that is a function of information relating to the output electrical conditions of said converter;

controlling said switching element by means of said control signal (CS);

compensating said control signal for a continuous conduction mode;

compensating said control signal for a discontinuous conduction mode;

estimating the current operating mode of said converter in order to control the implementation either of the continuous conduction mode compensation or of the discontinuous conduction mode compensation as a function of the estimated current operating mode;

said estimating comprising:

computing the theoretical duty cycle $\alpha_{CCM}$ in continuous conduction mode;

computing the theoretical value of the limit duty cycle $\alpha_{lim.th}$ between the two CCM and DCM operating modes, the theoretical value of the limit duty cycle $\alpha_{lim.th}$ being able to be computed on the basis of the following expression:

$$\alpha_{lim \cdot th} = 1 - \sqrt{\frac{2 \cdot L_p \cdot f_d}{Z_{th} \cdot N^2}},$$

where $L_p$ is the inductance of the transformer with respect to its primary winding, $f_d$ is the switching frequency of the switching element, $Z_{th}$ is the theoretical value of the load and N is the ratio of the number of turns of the transformer;

comparing the value of the theoretical duty cycle $\alpha_{CCM}$ in continuous conduction mode, the theoretical value of the limit duty cycle $\alpha_{lim.th}$ and the value of the current duty cycle $\alpha$; and determining the continuous conduction mode CCM if the value of the current duty cycle $\alpha$ greater than the value of the theoretical duty cycle $\alpha_{CCM}$ in continuous conduction mode;

determining the discontinuous conduction mode DCM if the value of the current duty cycle $\alpha$ is less than the theoretical value of the limit duty cycle $\alpha_{lim.th}$;

indetermining the operating mode if the value of the current duty cycle $\alpha$ is between the theoretical value of the limit duty cycle $\alpha_{lim.th}$ and the value of the theoretical duty cycle $\alpha_{CCM}$ in continuous conduction mode.

2. The control method as claimed in claim 1, said control method causing the control unit to compute the current theoretical value of the load $Z_{th}$ by considering that the converter operates in a stable manner on a discontinuous conduction mode and by considering the value of the duty cycle $\alpha$ of the control signal of the switching element, the ratio of the output voltage to the input voltage Ve, the no-load values of the components forming the converter and the values of the various operating parameters of the converter, such as the frequency $f_d$ of the control signal.

3. The control method as claimed in claim 2, said converter being of the Flyback type, in which the accumulation element is a transformer, the storage element is a capacitor, which is isolated from the secondary winding of the transformer, during the first part of each period, by a diode, wherein the current theoretical value of the load $Z_{th}$ computed during computation of the current theoretical value of the load is provided by the following relation:

$$Z_{th} = \frac{2 \cdot L_p \cdot f_d}{\left(\frac{Ve}{Vs} \cdot \alpha\right)^2},$$

where $L_p$ is the inductance of the transformer with respect to its primary winding, $f_d$ is the switching frequency of the switching element, Ve is the input voltage of the converter, Vs is the output voltage of the converter and $\alpha$ is the duty cycle of the control signal applied to the switching element.

4. The control method as claimed in claim 2, wherein the computing the theoretical value of the limit duty cycle $\alpha_{lim.th}$ between the two CCM and DCM operating modes is implemented by considering the ratio of the output voltage Vs to the input voltage Ve, the no-load values of the components forming the converter and the values of the various operating parameters of the converter, such as the frequency $f_d$ of the control signal CS, as well as the theoretical value of the load $Z_{th}$.

5. The control method as claimed in claim 4, wherein said converter is of the Flyback type, in which the accumulation element is a transformer, the storage element is a capacitor, which is isolated from the secondary winding of the transformer, during the first part of each period, by a diode.

6. The control method as claimed in claim 1, said control method causing the control unit to perform following the determining the continuous conduction mode CCM, activating the implementation of the continuous conduction mode compensation if this is not already activated and implemented following the determining of the discontinuous conduction mode DCM, of activating the implementation of the discontinuous conduction mode step if this is not already activated.

7. A DC-DC converter comprising:
an energy accumulation element,
an energy storage element,
a switching element
a control unit for generating a control signal for the switching element with a duty cycle $\alpha$ that is a function of information relating to the output electrical conditions of said converter and for controlling said switching element by means of said control signal;
a compensator for a continuous conduction mode;
a compensator for a discontinuous conduction mode;
a mode estimator for estimating the current operating mode in order to control, as a function of the estimated current operating mode, the activation either of the compensator for the continuous conduction mode or of the compensator for the discontinuous conduction mode;
said mode estimator comprising circuitry causing the DC-DC convertor to perform:
computing the theoretical duty cycle $\alpha_{CCM}$ in continuous conduction mode;
computing the theoretical value of the limit duty cycle $\alpha_{lim.th}$ between the two CCM and DCM operating modes, the theoretical value of the limit duty cycle ($\alpha_{lim.th}$) being able to be computed on the basis of the following expression:

$$\alpha_{lim \cdot th} = 1 - \sqrt{\frac{2 \cdot L_p \cdot f_d}{Z_{th} \cdot N^2}},$$

where $L_p$ is the inductance of the transformer with respect to its primary winding, $f_d$ is the switching frequency of the switching element, $Z_{th}$ is the theoretical value of the load and N is the ratio of the number of turns of the transformer;

comparing the value of the theoretical duty cycle $\alpha_{CCM}$ in continuous conduction mode, the theoretical value of the limit duty cycle $\alpha_{lim.th}$ and the value of the current duty cycle $\alpha$;

determining the continuous conduction mode CCM if the value of the current duty cycle $\alpha$ is greater than the value of the theoretical duty cycle $\alpha_{CCM}$ in continuous conduction mode;

determining the discontinuous conduction mode DCM if the value of the current duty cycle $\alpha$ is less than the theoretical value of the limit duty cycle $\alpha_{lim.th}$; and indetermining the operating mode if the value of the current duty cycle $\alpha$ is between the theoretical value of the limit duty cycle $\alpha_{lim.th}$ and the value of the theoretical duty cycle $\alpha_{CCM}$ in continuous conduction mode.

8. The DC-DC converter as claimed in claim 7, further comprising circuitry causing the DC-DC convertor to perform computing the current theoretical value of the load $Z_{th}$ by considering that the power supply operates in a stable manner on a discontinuous conduction mode and by considering the value of the duty cycle $\alpha$ of the control signal of the switching element, the ratio of the output voltage Vs to the input voltage Ve, the no-load values of the components forming the converter and the values of the various operating parameters of the converter, such as the frequency $f_d$ of the control signal.

9. The DC-DC converter as claimed in claim 8, wherein said computing of the theoretical value of the limit duty cycle $\alpha_{lim.th}$ between the two CCM and DCM operating modes that take into account the ratio of the output voltage Vs to the input voltage Ve, the no-load values of the components forming the converter and the values of the various operating parameters of the converter, such as the frequency $f_d$ of the control signal, as well as the theoretical value of the load $Z_{th}$.

10. The DC-DC converter as claimed in claim 7, circuitry causing the DC-DC convertor to perform activating the compensator if the estimated mode is the CCM mode and if the compensator is not already activated and activating the compensator if the estimated mode is the DCM mode and if the compensator is not already activated.

11. The DC-DC converter as claimed in claim 7, wherein it is of the Flyback type, in which the accumulation element is a transformer, the storage element is a capacitor, which is isolated from the secondary winding of the transformer, during the first part of each period, by a diode.

* * * * *